No. 670,870.  
J. R. DROZESKI.  
PIPE HANGER.  
(Application filed Nov. 23, 1900.)  
Patented Mar. 26, 1901.

(No Model.)

Witnesses.

Inventor.
Julius R. Drozeski,

UNITED STATES PATENT OFFICE.

JULIUS R. DROZESKI, OF ERIE, PENNSYLVANIA, ASSIGNOR OF ONE-HALF TO RAY HIMROD, OF SAME PLACE.

PIPE-HANGER.

SPECIFICATION forming part of Letters Patent No. 670,870, dated March 26, 1901.

Application filed November 23, 1900. Serial No. 37,497. (No model.)

*To all whom it may concern:*

Be it known that I, JULIUS R. DROZESKI, a citizen of the United States, residing at Erie, in the county of Erie and State of Pennsylvania, have invented certain new and useful Improvements in Pipe-Hangers; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in pipe-hangers; and it consists, substantially, in constructing a pipe-hanger of interchangeable parts which can be joined together by means of an intermediate section made of any desired length and also in making the interchangeable sections with slotted openings adapted to receive and retain a section of chain surrounding the pipe to be suspended therefrom. Some of the advantages of this construction are that the same-sized hanger can be used conveniently for suspending any size of pipe with equal facility, and the length of the intermediate section connecting the interchangeable sections can be varied to any extent desired. These and other features of the invention are hereinafter fully set forth and described, and illustrated in the accompanying drawings, in which—

Figure 1:
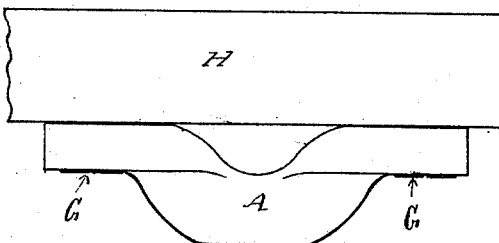
Figure 2:
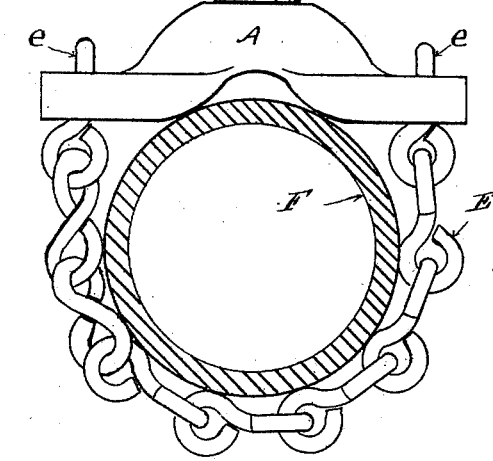
Figure 2:
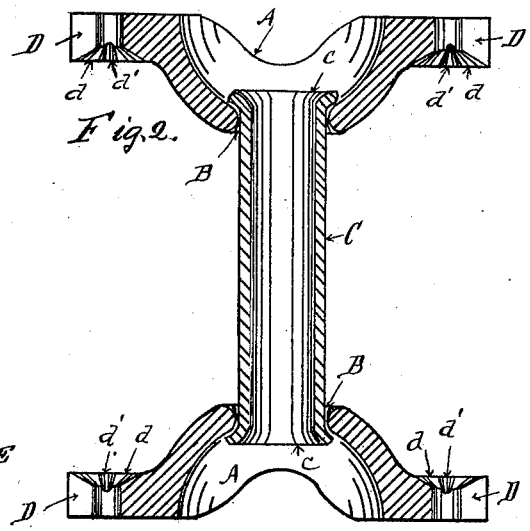
Figure 3:
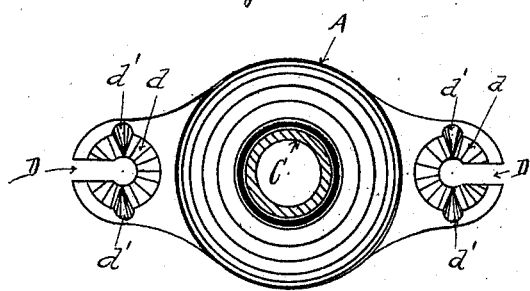

Figure 1 is a view in elevation of my improved pipe-hanger. Fig. 2 is a vertical section of my improved pipe-hanger. Fig. 3 is a transverse section of the same.

In the drawings thus illustrating my invention the sections A A are duplicate parts constructed with central openings B, in which the ends of an interchangeable section C, preferably made of pipe, are secured by flanging the ends *c c* thereof outward, as illustrated in Fig. 2. In the ends of the lateral projections on the sections A A there are slotted openings D, the inner ends *d* of which slotted openings are made concave on the outer surfaces of the parts A, and in the opposite sides of the concaved portions *d* of the slots D there are grooves *d' d'*, adapted to engage the links *e* of a chain E, as illustrated in Fig. 1, the grooves *d'* receiving the links *e* of the chain E, so as to prevent the links *e* of the chain when placed therein from being turned in the concaved portions *d* of the slots D when supporting a pipe F. The concave portions *d* of the slots D are also adapted to receive screws G for securing the upper one of the sections A to a joist H or other overhead support, while the intermediate section C can be made of any desired length to suit the distance between the overhead support H and the pipe F to be supported therefrom, thus enabling the operator to make any desired adjustment in the hanger without regard to the sections A A thereof.

Having thus fully described my invention, what I claim as new, and desire to secure by Letters Patent of the United States, is—

1. The combination in a pipe-hanger, of two interchangeable sections having central openings therein, lateral projections on said sections having slots in the ends thereof, with an intermediate section secured in the central openings in said interchangeable sections, substantially as and for the purpose set forth.

2. The combination in a pipe-hanger, of two interchangeable sections having central openings therein, an intermediate section secured in the central openings in said interchangeable sections, lateral projections on the opposite sides of said interchangeable sections having slots in the ends thereof, the inner ends of which are concaved, and a chain-section adapted to engage the concave portions of said slots substantially as and for the purpose set forth.

3. An interchangeable pipe-hanger section having a central opening therein, and lateral projections on opposite sides thereof having slots in the ends thereof, the inner ends of which slots are concaved and provided with grooves on opposite sides of the concave portions thereof, substantially as and for the purpose set forth.

In testimony whereof I affix my signature in presence of two witnesses.

JULIUS R. DROZESKI.

Witnesses:
H. M. STURGEON,
J. F. WALTHER.